(No Model.)
N. J. JOHNSON.
LAND ROLLER.
No. 450,514.  Patented Apr. 14, 1891.
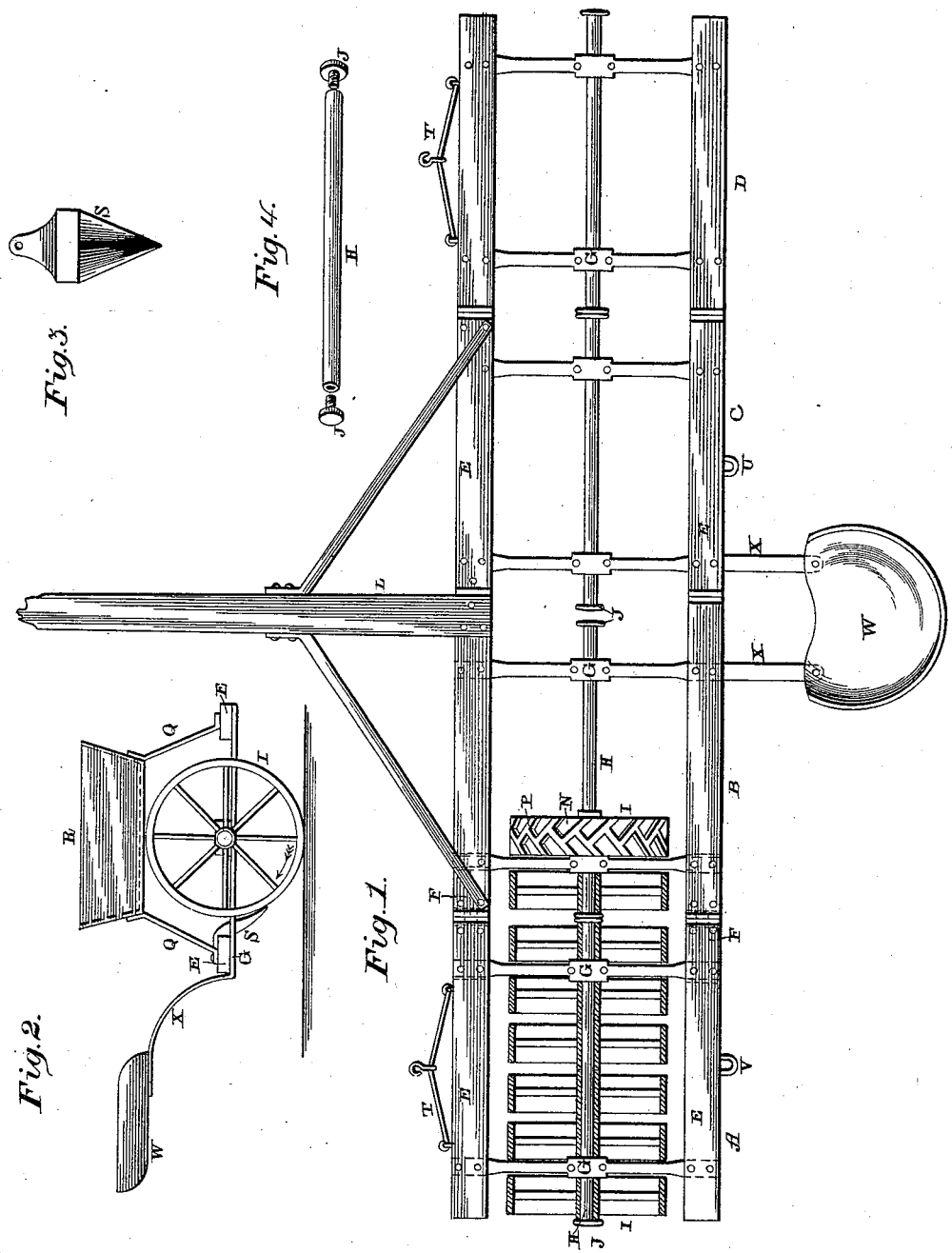
Witnesses:
E. P. Ellis,
B. B. Brockett,
Inventor:
N. J. Johnson,
per Lehmann & Pattison,
attys.

UNITED STATES PATENT OFFICE.

NELS J. JOHNSON, OF GRAFTON, NORTH DAKOTA.

LAND-ROLLER.

SPECIFICATION forming part of Letters Patent No. 450,514, dated April 14, 1891.

Application filed December 10, 1890. Serial No. 374,163. (No model.)

*To all whom it may concern:*

Be it known that I, NELS J. JOHNSON, of Grafton, in the county of Walsh and State of North Dakota, have invented certain new and useful Improvements in Land-Rollers; and I do hereby declare the following to be a full, clear, and exact description of the invention, such as will enable others skilled in the art to which it pertains to make and use the same, reference being had to the accompanying drawings, which form part of this specification.

My invention relates to an improvement in clod crushers and compressors and land-rollers; and it consists in the special construction and arrangement of parts, which will be fully described hereinafter, and pointed out in the claims.

The object of my invention is to provide a land-roller consisting of a series of sections pivotally connected together, each carrying a series of rollers, and to so mount the rollers that they produce substantially a continuous roller, which is flexible, so as to follow the unevenness of the surface being rolled.

A further object of my invention is to adapt the roller to be converted into either a two, three, or four horse roller, as may be preferred, and to so shape the surfaces of the rollers that the entire weight of the rollers and machine rests upon about one-third of the projecting surface of the wheels, which gives a very powerful crushing, compressing, and rolling action, and which leaves the surface rough, so that the fine dirt will be caught in the crevices and be prevented from being carried away by the wind, and also to so construct the surfaces of the rollers that the dirt will not be picked up by the wheels and carried to their top, where it is caught by the wind.

Figure 1 is a top plan view of a roller which embodies my invention complete, part of the rollers being omitted and the trough being also removed. Fig. 2 is a side elevation of the same. Fig. 3 is a detail view of the scraper. Fig. 4 is a detached view of one of the roller-axles.

A, B, C, and D represent four roller-frames, which consist each of the side bars E, and the transverse connecting-bars G, which also form journals for the roller shafts or axles H.

These frames are hinged together at their meeting ends by means of suitable hinges F, and have their meeting edges cut away, as shown, so as to allow each frame a free pivotal movement so as to follow the inequalities of the surface being rolled. The axles H are loosely placed within their bearings and the rollers I are loosely placed thereon, so that the rollers and the axles have an independent movement. The transverse bars G are placed just sufficiently far from the ends of the side bars E to allow one of the rollers I to be placed outside of it, and the ends of the axles are provided with a screw J, having an extending flange, which prevents the roller from sliding off of its axle. It will also be noticed that the meeting ends of the axles in the two end frames A D and the frames B C are in a line drawn through the pivotal point of the hinges, while the meeting ends of the axles of the two central frames B C are slightly beyond a line drawn through the pivotal point of their hinges and the axles slightly separated, as shown, so that the frames will be allowed a free pivotal movement. In order to accomplish this the frame B is made one-half the width of the tongue L longer than the end frames and the frame C made that much shorter than the end frames. The object of this construction is to provide a solid bearing for the inner end of the tongue L, and at the same time to bring the tongue at the center of the combined length of the several frames, so that the draft will be from the center. By placing the transverse bars G a suitable distance from the ends of the side bars E instead of at their ends, I am enabled to place a roller upon each end of each axle outside of the said transverse bars G, which prevents two of the transverse bars coming together, which would leave a space of considerable width without any rolling surface. By means of this construction I produce a roller which is substantially a continuous roller, while at the same time it is flexible for the purpose above set forth.

In order to give the roller a powerful crushing and compressing action, I form in the face thereof recesses N, which are double the width of the projecting surfaces P, so that the weight of the machine is upon one-third of the surface of the roller. At the same time the projecting surfaces P form depressions in the ground which is being rolled, into which the fine dirt is caught, so that it is not blown away by the wind. I also form the recesses P in the surfaces of the roller at an angle which inclines backward, so that the fine dirt which is caught thereby will slide off of the rollers, instead of being carried to their tops, where the wind has a good opportunity to blow the fine dirt and dust, which makes it very disagreeable for both the driver and the team. This construction also forms depressions, which intersect each other about midway, as will be readily understood, so that the dust and dirt are stopped in their rolling motion, no matter in which way the wind may be blowing.

Supported above the frames by means of suitable standards Q is a trough R, into which stone or other objects may be placed to weight the roller, when so desired.

Secured to the rear side bars of the frames are a series of scrapers S, which engage, respectively, the surfaces of the rollers, which remove any soil which may be adhering thereto. These scrapers are preferably made pointed, as shown, so that they will remove the soil with the slightest possible friction.

When it is desired to convert the roller into a three-horse roller, I detach one end section of the frame and place the tongue at the center of the combined length of the sections left. To convert it into a two-horse roller I detach the two outside frames or sections. By attaching these sections in a direct line and placing the tongue at the center, as described, the roller turns on its center, one end moving backward and the other forward in a perfect circle.

In order to facilitate transportation of the roller upon the road, so as to pass vehicles and over bridges, I secure to each end section draft-bars T, having hooks, so that the end sections can be detached and one hooked in the eye of the staple U, at the rear of the section C, and the other hooked in the staple V, which is in the rear side bar of the other end section. The seat W is supported upon suitable springs X, which have their inner ends secured to the center sections.

Having thus described my invention, I claim—

1. In a land-roller, the combination of several sections having their meeting ends pivoted together and each provided with a series of rollers, substantially as shown.

2. In a land-roller, the combination of a series of sections pivotally connected in a line, a series of axles having their meeting ends substantially in a line drawn through the pivotal points, and a series of rollers placed upon the axles, substantially as described.

3. In a roller, the combination of a series of sections pivotally connected in a line, each section consisting of transverse bars a suitable distance from their ends, axles supported thereon, and a series of rollers upon the axles, two of the rollers of each section being outside of the transverse bars, whereby substantially a continuous roller is provided, but which is flexible, for the purpose set forth, substantially as described.

4. In a land-roller, the combination of a series of sections pivotally connected in a line, each carrying rollers, the two center sections being of different lengths, and the tongue connected to the longest central section, for the purpose specified, substantially as described.

5. A land-roller consisting of a series of rollers, each having surfaces provided with recesses which incline backward from the center to opposite edges, for the purpose described, substantially as shown.

6. A land-roller consisting of a series of rollers, the surface of each roller having recesses which incline backward from the center to opposite edges, the recesses being of greater width than the projecting surface, whereby a more powerful crushing action is produced, substantially as described.

7. A land-roller consisting of a series of rollers, the surfaces of the rollers being each provided with backwardly-inclined recesses of twice the width of the projecting surfaces, the recesses inclining from the center to opposite edges of the roller, whereby the projecting surfaces intersect, as shown, for the purpose described.

In testimony whereof I affix my signature in presence of two witnesses.

NELS J. JOHNSON.

Witnesses:
D. C. MOORE,
FRED. W. MILLER.